US006864882B2

(12) United States Patent
Newton (10) Patent No.: US 6,864,882 B2
(45) Date of Patent: Mar. 8, 2005

(54) PROTECTED TOUCH PANEL DISPLAY SYSTEM

(75) Inventor: John Newton, Auckland (NZ)

(73) Assignee: Next Holdings Limited, Auckland (NL)

( * ) Notice: Subject to any disclaimer, the term of this patent is extended or adjusted under 35 U.S.C. 154(b) by 102 days.

(21) Appl. No.: 09/815,163

(22) Filed: Mar. 22, 2001

(65) Prior Publication Data

US 2002/0118177 A1 Aug. 29, 2002

(30) Foreign Application Priority Data

May 24, 2000  (NZ) ................................................ 504712
Oct. 10, 2000  (NZ) ................................................ 507413

(51) Int. Cl.[7] .............................................. G09G 5/00
(52) U.S. Cl. ...................... 345/173; 345/156; 345/175; 345/178
(58) Field of Search ................................ 345/156–157, 345/173, 175, 178; 178/18.01–18.09, 20.01

(56) References Cited

U.S. PATENT DOCUMENTS

| | | | |
|---|---|---|---|
| 3,764,813 A | | 10/1973 | Clement et al. ............ 250/221 |
| 4,243,879 A | * | 1/1981 | Carroll et al. ............. 250/221 |
| 4,459,476 A | | 7/1984 | Weissmueller et al. ...... 250/221 |
| 4,673,918 A | | 6/1987 | Adler et al. ................ 341/13 |
| 4,703,316 A | * | 10/1987 | Sherbeck .................... 345/175 |
| 4,737,631 A | | 4/1988 | Sasaki et al. .............. 250/221 |
| 4,766,424 A | | 8/1988 | Adler et al. ................ 345/175 |
| 4,851,664 A | | 7/1989 | Rieger ....................... 250/226 |
| 4,916,308 A | * | 4/1990 | Meadows .................... 250/221 |
| 4,928,094 A | | 5/1990 | Smith ......................... 340/712 |
| 4,943,806 A | * | 7/1990 | Masters et al. ............. 341/31 |
| 5,025,411 A | | 6/1991 | Tallman et al. ............. 364/900 |
| 5,103,085 A | * | 4/1992 | Zimmerman ................. 250/221 |
| 5,105,186 A | | 4/1992 | May .......................... 340/784 |
| 5,148,015 A | | 9/1992 | Dolan ........................ 250/221 |
| 5,162,783 A | | 11/1992 | Moreno ...................... 340/712 |
| 5,179,369 A | | 1/1993 | Person et al. .............. 345/175 |
| 5,196,836 A | | 3/1993 | Williams .................... 345/175 |
| 5,422,494 A | * | 6/1995 | West et al. ................. 250/551 |
| 5,457,289 A | | 10/1995 | Huang et al. ................ 178/20 |
| 5,591,945 A | | 1/1997 | Kent .......................... 178/19 |
| 5,698,845 A | * | 12/1997 | Kodama et al. ............. 250/221 |
| 5,739,479 A | | 4/1998 | Davis-Cannon et al. ...... 178/19 |
| 5,784,054 A | | 7/1998 | Armstrong et al. ......... 345/177 |
| 5,785,439 A | | 7/1998 | Bowen ........................ 400/472 |
| 5,804,773 A | | 9/1998 | Wilson et al. ............... 178/19 |
| 5,940,065 A | | 8/1999 | Babb et al. ................. 345/178 |
| 5,988,645 A | * | 11/1999 | Downing .................... 273/348 |
| 5,990,874 A | * | 11/1999 | Tsumura et al. ............ 345/173 |
| 6,076,041 A | * | 6/2000 | Watanabe ................... 701/211 |
| 6,091,406 A | | 7/2000 | Kambara et al. ........... 345/177 |
| 6,377,228 B1 | * | 4/2002 | Jenkin et al. ............... 345/1.3 |
| 6,384,743 B1 | * | 5/2002 | Vanderheiden .............. 341/21 |
| 6,429,857 B1 | * | 8/2002 | Masters et al. ............. 345/175 |

OTHER PUBLICATIONS

"Store Window Presentations," Heddier Electronic.
"ThruGlass," Projected Capacitive Touchscreens Specifications, MicroTouch.

* cited by examiner

Primary Examiner—Vijay Shankar
Assistant Examiner—Leonid Shapiro
(74) Attorney, Agent, or Firm—King & Spalding LLP (57) ABSTRACT

A display screen is positioned relative to the interior side of a protective barrier. Also positioned relative to the interior side of the protective barrier are emitters adapted for emitting energy beams and detectors adapted for detecting the energy beams. Emission guides positioned relative to the exterior side of the protective barrier are adapted to receive the energy beams and to channel the energy beams across the exterior side of the protective barrier and through to the interior side of the protective barrier for detection. The display screen, the emitters and the detectors may not be accessible from the exterior side of the protective barrier. A touch on the exterior side of the protective barrier will interrupt at least two energy beams. The location of the touch on the exterior side of the protective barrier may be calculated based on the interrupted energy beams.

34 Claims, 6 Drawing Sheets

PROTECTED TOUCH PANEL DISPLAY SYSTEM

RELATED APPLICATIONS

The present application claims the benefit of New Zealand Provisional Patent Application Serial No. 504,712, entitled "Touch Panel Display System," filed with the New Zealand Patent Office on May 24, 2000. The present application also claims the benefit of New Zealand Provisional Patent Application Serial No. 507,413 entitled "Improved Touch Panel Display System," filed with the New Zealand Patent Office on Oct. 10, 2000.

TECHNICAL FIELD

The present invention relates generally to a touch panel display system that displays information and allows a user to interact with the system by touching on or near the displayed information. More particularly, the present invention relates to a touch panel display system that includes energy emitters for emitting energy beams across the surface of a display screen and detectors for detecting the energy beams, a touch of the display surface causing an interruption of the energy beams.

BACKGROUND OF THE INVENTION

Many businesses would like to provide information to and interact with potential customers outside of normal business hours. To do so normally requires that a business stay open for longer hours and pay its staff for additional working time. In order to avoid increased operational costs, some businesses have simply settled for displaying information in their windows or storefronts in order to provide customers with information after normal business hours. Still, while customers can review information posted in a store window after normal business hours, they cannot practically supply feedback to the business or request further information until the business reopens.

As a solution to the problem of providing information to and interacting with potential customers outside of normal business hours, a business may provided access to a computer system, such as by way of a kiosk situated external to the business premises. A potential customer may interact with the computer system in order to review information displayed on the computer display screen and to provide further feedback or request additional information from the business. Computer systems can also be used to facilitate a purchase using credit card numbers, bankcards numbers or other financial account identifiers without the customer needing to enter the business premises and interact with the businesses staff.

A touch panel display system (i.e., a touch panel display screen coupled with a computer system) can be useful in a kiosk environment. A touch panel display screen can provide an intuitive method by which people can easily interact with and control certain functions performed by a computer system. Furthermore, a touch panel display screen can display icon elements representing a keyboard to allow the user to key in text to the associated computer system. An interactive graphical representation of a keyboard can eliminate the need to configure the computer system with a physical keyboard and/or other peripheral input devices (e.g., a mouse).

One type of touch panel display screen can be constructed by capacitance forming elements formed integrally into the display screen. The user placing a finger or stylus on the display screen will change the capacitance in a particular region of the display screen, thereby indicating to the computer system which area of the display screen has been touched. Other types of touch panel displays transmit energy beams across the face of the display screen. These energy beams are typically transmitted in an arrangement of columns and rows. When a finger or stylus interrupts an intersecting column and row of energy beams, the computer system can detect which area of the display screen has been touched.

Touch panel display screens that emit beams of energy across the face of the display screen can be highly susceptible to component failure. Such a system will not be able to accurately detect the touch of a user in an area of the display screen that is covered by a failed emitter and/or a failed detector. A failed emitter and/or detector can also result in the system being unable to detect any touches at all in a particular area of the display screen. Furthermore, if the emitters or detectors become dirty, their ability to detect or transmit energy beams will be impaired and will lead to the same problems as if the components had failed.

As compared with regular (non-touch panel) display devices, touch panel display screens are relatively expensive and time consuming to produce. Because of the higher cost of touch panel display screens, they are not used widely in applications where they can be damaged, easily stolen or exposed to weather. Thus, touch panel display systems have heretofore been undesirable for use in unattended kiosk environments, which are extremely vulnerable to theft, vandalism or damage by passers-by and can deteriorate or be damaged if not sufficiently protected from adverse weather conditions. While kiosks can be constructed such that most or all of the hardware components of the computer system are secured within a permanent protective enclosure, such a protective enclosure can be relatively expensive to implement. Furthermore, in a touch panel display system implementation, at least the touch panel display screen must remain exposed from the protective enclosure.

Accordingly, there remains a need for a touch panel display system that has a reduced susceptibility to component failure or dirt build-up on components resulting from vandalism, improper use, or exposure to weather. There is a further need for an improved touch panel display system that limits the user's direct access to the touch panel display screen, while still allowing the user to interact with the touch panel display screen.

SUMMARY OF THE INVENTION

The present invention satisfies the above-described needs by providing a protected touch panel display screen. A protective barrier is provided through which light and energy can be emitted. The protective barrier has an interior side and an exterior side. As an example, the protective barrier may be a layer of glass, such as a window. A display screen for displaying information is positioned relative to the interior side of the protective barrier. Also positioned relative to the interior side of the protective barrier are a plurality of emitters adapted for emitting energy beams and at least one detector adapted to detect the energy beams emitted by at least one of the emitters. At least one emission guide is positioned relative to the exterior side of the protective barrier. The emission guide is adapted to receive the energy beams emitted by at least one of the plurality of emitters and to channel the received energy beams across the exterior side of the protective barrier and through to the interior side of the protective barrier for detection by the at least one detector. The protective barrier may be implemented such that the display screen, the emitters and the at least one detector are not accessible from the exterior side of the protective barrier.

The plurality of emitters may be positioned such that the energy beams channelled across the exterior side of the protective barrier substantially cover the display screen. In addition, signage may be displayed on the interior side of the protective barrier so as to be visible from the exterior side of the protective barrier. The plurality of emitters may thus be positioned such that the energy beams channelled across the exterior side of the protective barrier substantially cover the display screen and the signage. The detector may be capable of detecting the energy beams over a range of angles.

The emission guides are adapted to change the direction of travel of the energy beams emitted by the emitters. As an example, the emission guides may be constructed from material having a different refractive index from that of the protective barrier. The difference in refractive index may be employed to change the direction of travel of the energy beams. One or more interior emission guides may be positioned relative to the interior side of the protective barrier. An interior emission guide may be adapted to receive the energy beams from at least one of the emitters and channel the energy beams through to the exterior side of the protective barrier. An interior emission guide may also or alternately be adapted to receive the energy beams channelled through the protective barrier by the at least one emission guide and to channel the energy beams to the at least one detector.

The information displayed on the display screen may comprise a dynamically changeable image or a static image. A user may touch the exterior side of the protective barrier to interact with the information displayed by the display screen. A touch on the exterior side of the protective barrier will interrupt at least two of the energy beams and will cause the at least one detector to not detect the at least two interrupted energy beam. The location of the touch on the exterior side of the protective barrier may be calculated based on the at least two interrupted energy beam.

The present invention may also include a processor for executing computer-executable instructions for controlling the touch panel display screen. For example, the processor may execute instructions for determining that at least two of the energy beams has been interrupted by a touch of the protective barrier based on an absence of expected detection signals from one or more detectors. Based on the at least two interrupted energy beam, the processor may execute further instructions for determining the location of the touch on the protective barrier. Also, the processor may execute further computer instructions for comparing a current detection map with a previously stored detection map. A difference between the current detection map and the previously stored detection map may indicate the absence of the expected detection signal(s).

The processor may also execute computer executable instructions for controlling activation of the emitters. As one example, the processor may control activation of the emitters by controlling the emitters to emit the energy beams in a cycle such that each emitter is activated and deactivated according to a sequence. The cycle may be rapid enough to substantially ensure that a plurality of the energy beams will be interrupted by a touch of the protective barrier, each of the interrupted energy beams being emitted by different ones of the emitters at different times. As another example, the processor may control the emitters by controlling the duty cycle of the emitters. In this situation, the detectors may be adapted for automatic gain control for adjusting the sensitivity of the detectors in response to a change in the duty cycle of the emitters. The duty cycle of the emitters may be changed, for example, depending on ambient light levels.

Further aspect and features of the invention will become apparent from the following description of exemplary embodiments and with reference to the accompanying drawings.

DETAILED DESCRIPTION OF EXEMPLARY EMBODIMENTS OF THE INVENTION

The present invention provides a touch panel display system that is adapted to detect user feedback commands through a protective barrier, such as a layer of transparent or translucent material. A touch panel display system of the present invention may employ one or more emitters that are adapted to emit beams of energy. Emission guides may be employed to channel the beams of energy through and across the protective barrier that guards the touch panel display screen. The energy beams emitted by the emitters may be invisible to the human eye and may be of a power or frequency that will not cause health problems in a user. A touch panel display system may also include one or more detectors that are adapted to detect and receive the energy beams generated by the emitters. Those skilled in the art should appreciate that the type of detector involved will be determined by the type of energy emitted by each of the energy emitters. Examples of energy types that may be used in the present invention include, but are not limited to, infrared, visible light, microwave radiation, and acoustic energy.

A touch panel display system of the present invention includes at least one touch panel display screen and any other hardware and/or software components necessary for detecting and calculating the location of a touch thereon or executing other software programs. A touch panel display screen may be adapted to display information in the form of static images, video images, text or any other type of graphics. The information displayed by a touch panel display screen may be used to inform a user of the system and/or form part of a user interface. The user may interact with the user interface to instruct the system to perform a function or task. For example, in one embodiment the touch panel display screen may be used to display advertising material to a user and may also display images to assist in the completion of a financial transaction.

User feedback commands can be provided by way of the user touching with a stylus, finger or other pointing device, a selected area of the touch panel display screen that indicates a desired function or portion of the displayed information. A finger, stylus or other pointing device placed on or adjacent to the touch panel display screen will interrupt the energy beams emitted by the emitters. In response to detecting the interruption of the energy beams, the detectors may generate signals from which the touch panel display system is able to calculate the location of the touch on the touch panel display screen.

Figure 1:
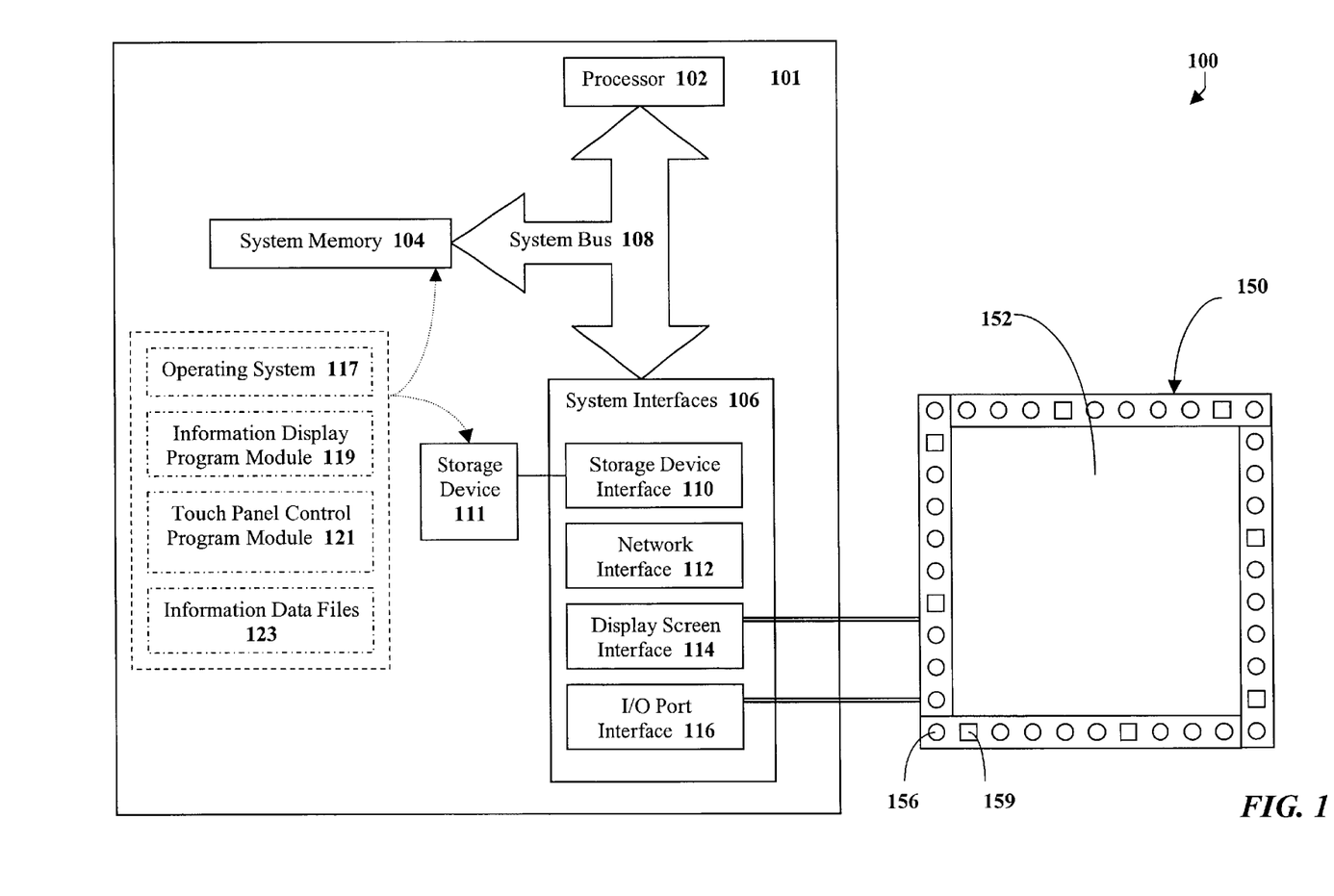
FIG. 1 is a block diagram illustrating an exemplary touch panel display system in accordance with an exemplary embodiment of the present invention.

The following description will hereinafter refer to the drawing, in which like numerals indicate like elements throughout the several figures. FIG. 1 is a block diagram illustrating an exemplary touch panel display system 100 in accordance with an exemplary embodiment of the present invention. The touch panel display system 100 comprises a computing device 101 functionally coupled to a touch panel display screen 150. The computing device 101 used in conjunction with the present invention may be any type of processor-driven device, such as a personal computer, a laptop computer, a handheld computer, a personal digital assistant (PDA), a digital and/or cellular telephone, a pager, a video game device, etc. These and other types of processor-driven devices will be apparent to one of ordinary skill in the art. As used herein, the term "processor" is meant to refer to any type of programmable logic device, including a microprocessor and any other type of similar device.

The computing device 101 may include, for example, a processor 102 a system memory 104 and various system interfaces 106. The processor 102, system memory 104 and system interfaces 106 may be functionally connected via a system bus 108. The system interfaces enable the processor 102 to communicate with peripheral devices. For example, a storage interface 110 provides an interface between the processor 102 and a storage device 111 (removable and/or non-removable), such as a disk drive. A network interface 112 may optionally be provided as an interface between the processor 102 and a network communications device (not shown), so that the computing device 101 may be connected to a network.

A display screen interface 114 provides an interface between the processor 102 and a display screen 152. Input/Output ("I/O") port interfaces 116 may be provided as interfaces between the processor 102 and various input devices and/or various output devices. For example, the detectors 159 of the touch panel display screen 150 may be connected to the computing device 101 by way of an input port and may provide input to the processor 102 via an input port interface. Similarly, the emitters 156 of the touch panel display screen 150 may be connected to the computing device 101 by way of an output port and may receive output from the processor 102 via an output port interface.

A number of program modules, including an operating system 117, may be stored in the system memory 104 and in any other computer-readable medium associated with a storage device 111 (e.g., a hard disk drive). Certain aspects of the present invention may be embodied in an "Information Display" program module 119 comprising computer-executable instructions for displaying images or other information on a display screen 152. Other aspect of the present invention may be embodied in a "Touch Panel Control" program module 121 for controlling the emitters 156 and detectors 159 of a touch panel display screen 150 and for calculating touch positions on the display screen 152 based on signals received from the detectors 159. Furthermore, the images or other information displayed by the "Information Display" program module 119 may be stored in one or more information data files 123 stored on any computer readable medium associated with the computing device 101.

The processor 102, controlled by the operating system 117, may be configured to execute the computer-executable instructions of the "Information Display" program module 119, the "Touch Panel Control" program module 121, and/or other program modules in order to perform or facilitate the methods of the present invention. For example, the processor 102 may execute computer-executable instructions for determining or receiving information from each detector 159 when a beam of energy is received. The processor 102 may also be adapted to determine when the user has attempted to touch an element or graphic displayed on the display screen 152. In one embodiment, the processor 102 may be configured to determine which of the energy beams transmitted across the face of the display screen 152 are interrupted by the user's finger, pen, stylus or other element.

For example, the processor 102 may monitor activation of the emitters 156 and energy beam detection signals generated by the detectors 159 in order to build a profile or "detection map" 125 indicating which detectors 159 receive energy beams at any particular time. One or more detection maps 125 may be stored in the system memory 104 or on any other computer-readable medium associated with the computing device 101. When a user touches on or in proximity to the display screen 152, the transmission of an energy beam (preferably two or more energy beams) will be interrupted for a short period of time. When the interruption of an energy beam occurs, a detector 159 will not detect the energy beam as expected and will not generate a detection signal. The processor 102 may determine the absence of an expected detection signal by comparing a current detection map 125b created at the time of the touch to one or more reference detection maps 125a created when the display screen 152 was not being touched. Based on information regarding the interrupted energy beams, the processor 102 may be configured to calculate or determine the location of the use's touch on or in proximity to the display screen 152. Exemplary methods for calculating or determining the location of a user's touch on or in proximity to the display screen 152 will be described below.

The use of detection maps 125 and the cyclical divergence of energy beams across the display screen 152 improves the tolerance of the touch panel display system 100 to component failure or dirt build-up on emitters 156 or detectors 159. As multiple energy beams are diverged across the surface of the display screen 152 over time, detection maps 125 may be created which will take into account any failed or malfunctioning detectors or emitters. By examining an average of several previously stored detection maps 125, the processor 102 may determine that a continued absence of a detection signal by one or more detectors is not the result of temporary energy beam interruption caused by a touch. Thus, exemplary embodiments of the present invention may have an inherent robustness and redundancy that will allow the touch panel display system 100 to continue to function effectively even if one or more emitters 156 or detectors 159 fails.

Those skilled in the art should appreciate that the "Information Display" program module 119 and the "Touch Panel Control" program module 121 are described herein by way of illustration only. Functionality of the present invention may be provided by way of any type and number of program modules, created in any programming language, which may or may not be stored locally at the computing device 101. For example, the computing device 101 may comprise a network server, client, or appliance that may be configured for executing program modules (e.g., 119 and 121) that are stored on another network device and/or for controlling a remotely located touch panel display screen 150. Accordingly, the touch panel display screen 150 of the present invention may provide an intuitive control interface for any computing device that can detect the position on a display screen 152 that has been touched by a user.

Figure 2:
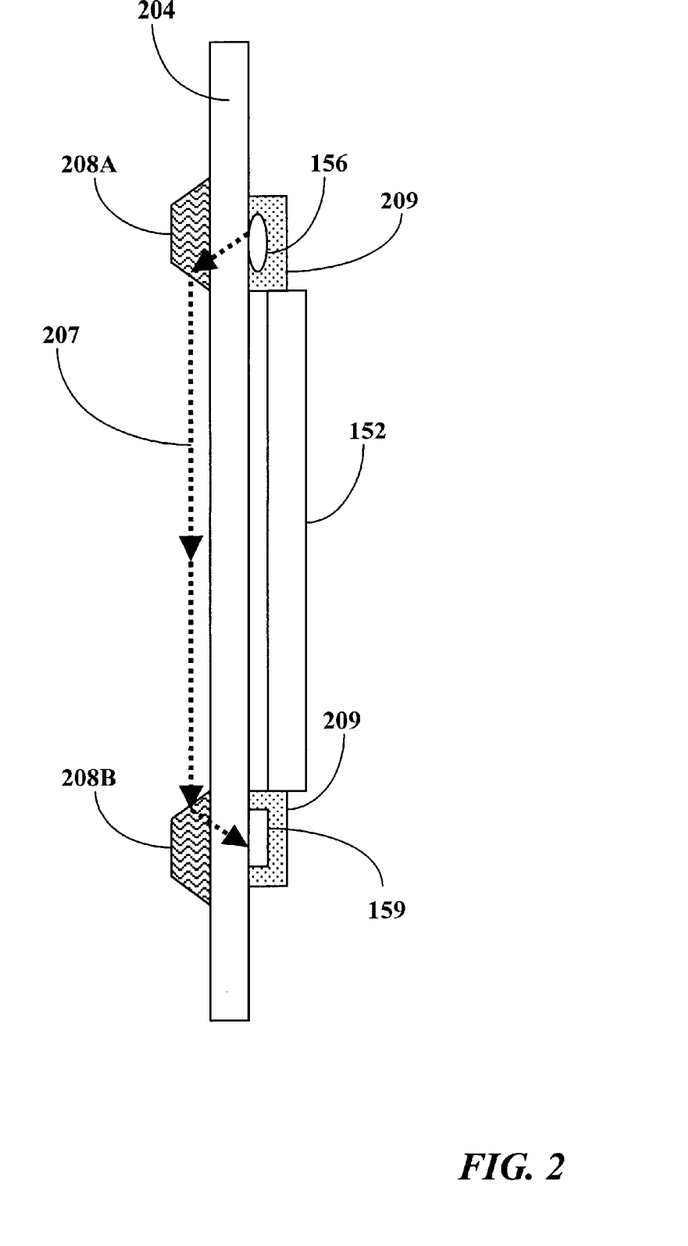
FIG. 2 shows a block schematic cross section view of a touch panel display screen in accordance with an exemplary embodiment of the present invention.

FIG. 2 shows a block schematic cross section view of a touch panel display screen 150 in accordance with an exemplary embodiment of the present invention. Although only certain components are shown in the figure, a touch panel display screen 150 generally comprises a display screen 152 configured with hardware and possibly software components for detecting a touch provided by a user. As shown, an exemplary touch panel display screen 150 includes a display screen 152, a plurality of emitters 156 and detectors 159, and a pair of emission guides 208A&B which are adapted to channel the energy beams 207 emitted from emitters 156 through and across a protective barrier 204 and on to the detectors 159. The emitters 156 and detectors 159 may be supported by a housing 209, which may optionally be attached to the display screen 152. By way of example only, the protective barrier 204 may be implemented with any type of material through which images may be viewed relatively clearly. Such materials may be transparent, possibly translucent, polarised or not fully transparent to visible light. Glass, plastic, plexi-glass, acrylics, crystal and other materials may be used to form the protective barrier in accordance with the present invention.

The display screen 152 may be, for example, a liquid crystal display ("LCD") screen. Those skilled in the art will appreciate, however, that any type of display screen may be used in conjunction with the present invention. By way of example only, other types of display screens that may be used in conjunction with the present invention include cathode ray technology, polysilicon thin film transistor ("TFT"), super twisted nematic ("STN"), twist nematic ("TN"), plasma display panels ("PDP"), or electro-luminescence display technology. In addition, vacuum fluorescent displays, field emission displays, digital micro mirror devices or light emitting diodes display technology may also be used. The applicants also consider that plasma addressed liquid crystal displays, anti-ferroelectric liquid crystal displays, and also ferroelectric liquid crystal displays can all also be used to provide a display screen in conjunction with the present invention.

The display screen 152 may be a component of any number of different types of computing devices. The display screen 152 may form part of, for example, a laptop computer or a wireless application protocol enabled cellular or digital phone display. A wide number and range of applications are envisioned for the present invention and discussion of particular applications throughout this specification should in no way be seen as limiting. A display screen 152 may also be a surface for mounting a graphic, such as a poster, bill or other static image. Such an embodiment may be used in simple applications, where the information provided to the user remains constant over certain periods of time. For example, in an exemplary embodiment, a static image (e.g., a poster or other signage) associated with a taxi company may be displayed on the display screen 152 and the user may touch the display screen 152 in order to generate a request for a taxi pick-up.

In a preferred embodiment the touch panel display system 100 of the present invention may include one display screen 152. One single display screen 152 may be adequate for most applications of the present invention, where existing computer technology can be used to control the images or graphics that are displayed on different portions of the display screen 152. However, those skilled in the art should appreciate that any number of display screens may be used in conjunction with the present invention, and reference to a single display screen throughout this specification should in no way be seen as limiting. Furthermore, a display screen 152 can be described as being a standard rectangular or square display screen commonly used in existing computer systems, but again this should in no way be seen as limiting. The present invention may be adapted for implementation with a display screen 152 of any shape or configuration.

The emitters 156 and detectors 159 may be adapted, for example, to emit and detect infrared energy beams. Those skilled in the art will appreciate that infrared radiation can be emitted at low power or low energy in a focused linear beam that is invisible to normal human vision. Infrared emitters and detectors are well known in the art and can be purchased and installed within a touch panel display screen 150 of the present invention at relatively low cost. However, it should be appreciated that other forms of energy may be used in conjunction with the present invention and reference to infrared throughout this specification should in no way be seen as limiting. For example, in other embodiments, visible light, microwave energy or even acoustic waves may be potentially be emitted and detected in accordance with the present invention.

An emission guide 208 may be adapted to receive an energy beam 207 generated by an emitter 156 and change or channel the beam's direction of travel. An emission guide 208 may be used by the present invention to channel each emitted energy beam 207 across or parallel to the face of the display screen 152. In a preferred embodiment an emission guide 208 may be positioned on or attached to what can be defined as the external side of a protective barrier 204. The other components of the touch panel display system 100, such as the touch panel display screen 150, the emitters 156 and the detectors 159 may be positioned, located or attached to the opposite or internal side of the protective barrier 204. The energy beams 207 generated by each emitter 156 can be aimed or directed into the protective barrier 204, for example, at the internal side of the protective barrier 204. The energy beams may travel through the protective barrier and exit on the external side thereof, preferably adjacent to or into an emission guide 208. The emission guide 208 may then change the direction of travel of the energy beam 207 so that it will run along the external side of the protective barrier 204 parallel to the display screen 152 located behind the internal side of the protective barrier 204. The same emission guide 208 or alternatively another emission guide 208 may also be used to channel energy beams 207 running on the external side of the protective barrier 204 back through the protective barrier 204 and onto or towards a detector 159 located behind the internal side of the protective barrier 204.

In a preferred embodiment of the present invention, an emission guide 208 may be any element or component that is adapted to change the direction of travel of an energy beam 207 generated by an emitter 156. For example, in one embodiment energy reflecting elements, such as mirrors or other reflectors, may be used as emission guides 208. Alternatively, energy refracting elements may be used which rely on their geometry and refractive index to change the direction of the energy beam 207. As will be appreciated by those skilled in the art, these types of emission guides 208 may be manufactured inexpensively and installed easily on the external side of a window using adhesive or other convenient types of attachment means.

In a further preferred embodiment an emission guide 208 used with the present invention may rely on its own refractive properties to channel an energy beam 207 parallel to the display screen 152. Such a refractive emission guide 208 may be constructed from material through which the energy beam 207 may travel. The refractive emission guide 208 may be selected having a refractive index and a particular geometry that will result in the energy beam 207 being channelled in the required direction. Angled faces formed into a refractive emission guide 208 combined with a difference in the refractive index of the emission guide 208 and the refractive index of the protective barrier 204 can be used to angle an energy beam 207, for example, either in a direction parallel to the protective barrier 204 or back through the protective barrier 204 to the internal side thereof. Such refractive emission guides 208 may be manufactured relatively inexpensively.

The use of emission guides 208 for channelling energy beams 207 emitted behind a protective barrier 204 through and/or across the protective barrier 204 substantially reduces the amount of hardware or components of the touch panel display system 100 which need to be located external to the protective barrier 204. The protective barrier may form part of a storefront (e.g., a storefront window), a kiosk, or a protective enclosure, behind which the majority of the components of the touch panel display system 100 may be located. As described, an exemplary embodiment of the present invention may be configured such that only the inexpensive emission guide(s) 208 are located on the exterior side of the protective barrier 204 and are susceptible to damage, theft or vandalism.

Figure 3:
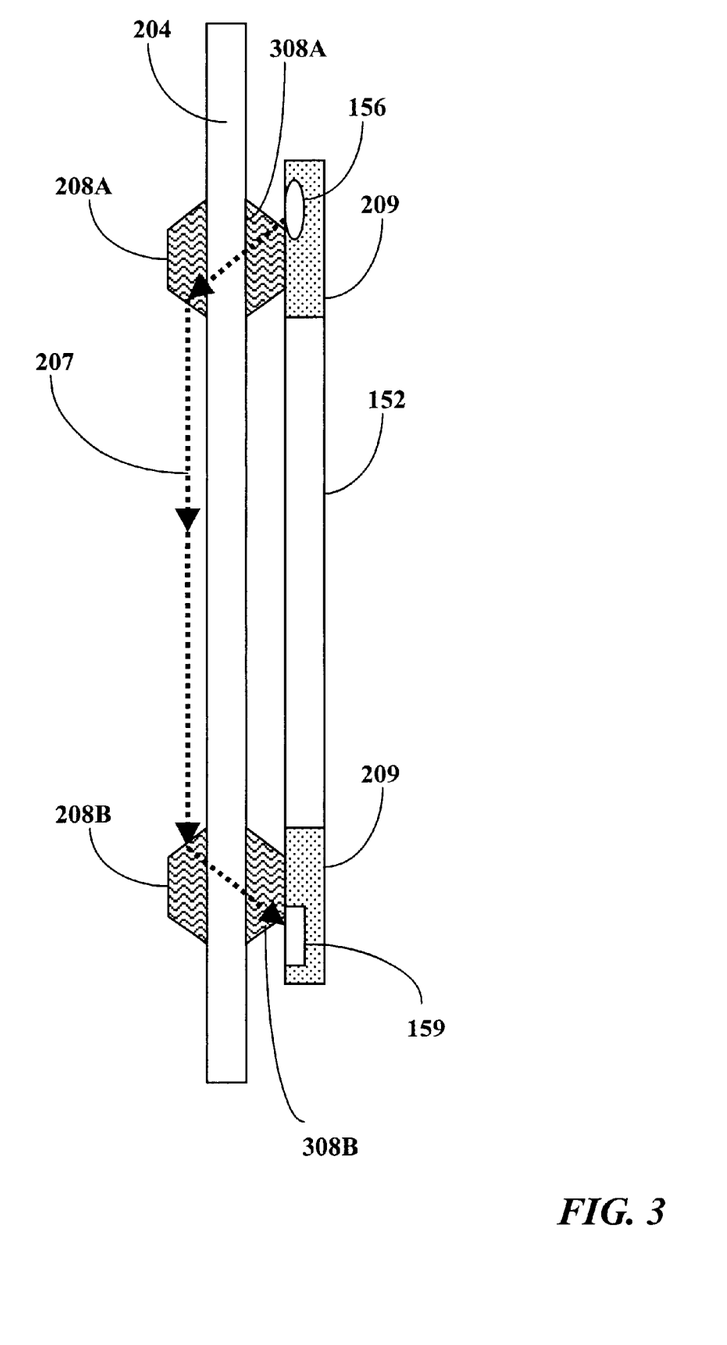
FIG. 3 shows a block schematic cross section view of a touch panel display screen in accordance with an alternate embodiment of the present invention.

FIG. 3 shows a block schematic cross section view of an alternate embodiment of the present invention. The main difference between the embodiments shown with respect to FIG. 2 and FIG. 3 is the addition in FIG. 3 of further sets of emission guides 308A&B on the interior side of the protective barrier 204. An internal emission guides 308A may be adapted to direct an energy beam 207 emitted by an emitter 156 into the protective barrier 204 and through the protective barrier 204 to an external emission guide 208A. An internal emission guide 308B may also be adapted for receiving an energy beam 207 as it exits the protective barrier 204 on the interior side thereof and for directing the energy beam 207 to a detector 159. Accordingly, emission guides 208 and 308 may be positioned relative to the exterior side and/or interior side of the protective barrier 204.

Figure 4:
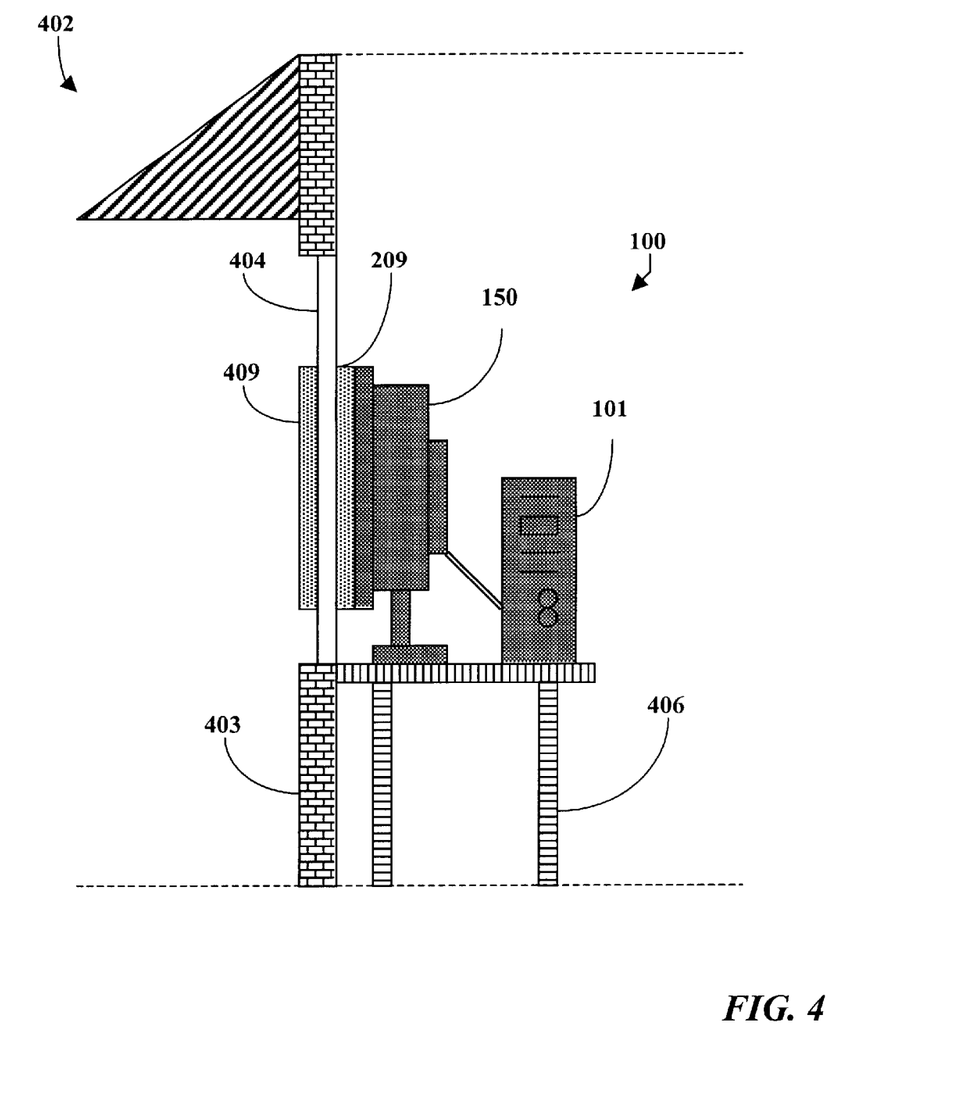
FIG. 4 is a cross-sectional view of an exemplary storefront illustrating an exemplary embodiment of the present invention.
Figure 5:
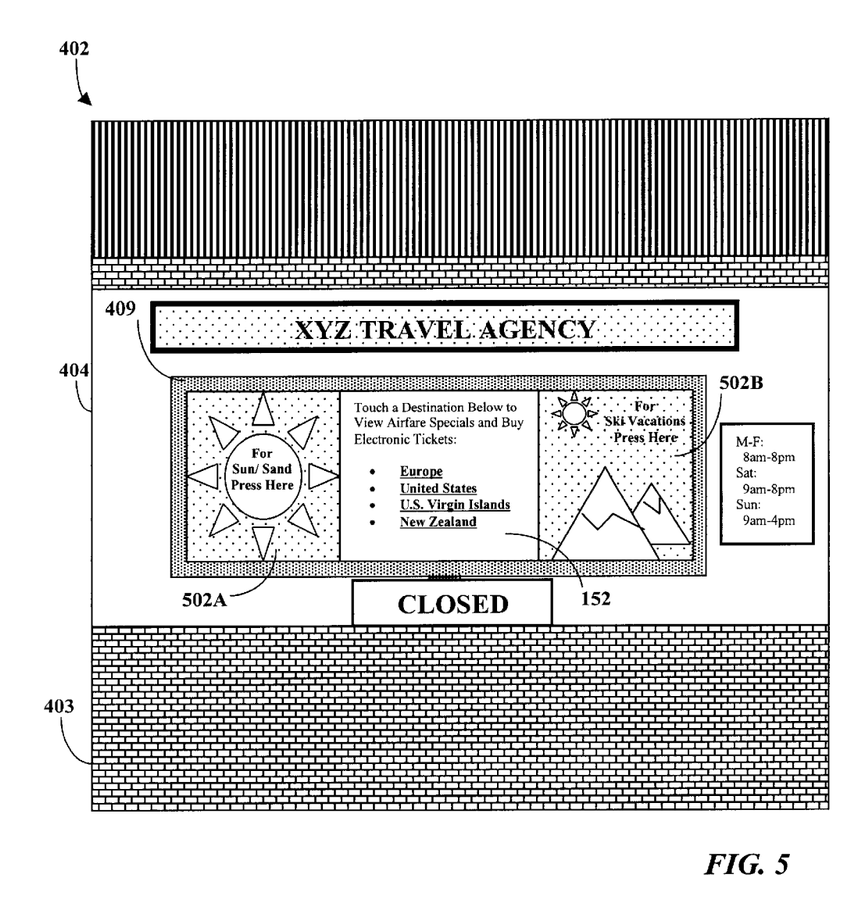
FIG. 5 is a frontal view of an exemplary storefront illustrating an exemplary embodiment of the present invention.

FIG. 4 and FIG. 5 provide views of an exemplary storefront 402 illustrating an exemplary embodiment of the present invention. FIG. 4 is a cross-sectional view of the exemplary storefront 402, showing the positioning of a touch panel display system 100 behind the exterior wall 403 thereof. FIG. 5 is a frontal view of the exemplary storefront 402, illustrating the touch panel display system as viewed from outside the storefront 402. As shown, the exterior wall 403 of the storefront 402 includes a window 404, which serves as the protective barrier 204 of the present invention. The window 404 may be transparent to visible light and also to the energy beams generated by the touch panel display screen 150 of the invention. Thus, the transparency of the window 404 allows an image displayed by the touch panel display screen 150 to be viewed by a user standing external to the storefront 402 and allows the touch panel display system 100 to detect the touch of the user on the external side of the window 404 near or adjacent to the touch panel display screen 150.

the exemplary embodiment of the present invention shown in FIG. 4 and FIG. 5 may allow a potential customer positioned outside of a building to interact with a computer system 101, while substantially limiting the hardware components that are exposed to the potential customer outside of the building. The emitters 156, detectors 159 and emission guides 308 of the touch panel display screen 150 may all be located on the inside of a building (i.e., on the interior side of the window 404). As shown in FIG. 4 and FIG. 5, emission guides 208 positioned external to the window 404 may be covered by an external protective/decorative bezel 409. As shown in FIG. 4, the emitters 156, detectors 159 and any emission guides 308 positioned relative to the interior side of the window 404 may be supported by or within a housing 209.

In a preferred embodiment, the touch panel display screen 150 incorporates a liquid crystal display screen 152. The LCD display screen 152 is placed on the interior side of the window 404. The LCD display screen 152 is positioned such that it displays images that may be viewed by a person standing on the exterior side of the window 404. Also located on the interior side of the window 404 is at least one energy emitter 156, which is preferably an infrared emitter. The infrared emitter 156 is adapted to generate and transmit an infrared energy beam 207 towards the interior side of the window 404.

Preferably the window 404 is constructed from glass, which will allow the energy beam 207 to travel through the body of the window 404 and out through to the exterior side of the window 404. At the point where the energy beam 207 exits the window 404, there is provided one of a pair of emission guides 208A, which is adapted to channel or change the direction of travel of the energy beam 207. The emission guide 208A may rely on refractive principles to bend or channel the energy beam 207 in the direction required to allow the present invention to function effectively. The emission guide 208A is adapted to channel the energy beam 207 so that it will run parallel to the exterior side of the window 404 and the front face of the LCD display screen 152. A second emission guide 208B is adapted to receive the energy beam 207 and channel the energy beam 207 back through the window 404 and towards an infrared detector 159.

As should be apparent to those of ordinary skill in the art, the touch panel display screen 150 may include a number of emitters 156 and detectors 159 positioned around the display screen 152. These emitters 156, detectors 159 and associated emission guides 208,308 are adapted to provide a number of energy beams that are channelled out through the window 404, travel across the exterior face of the window 404, horizontally and/or vertically and/or diagonally, etc., and are then channelled back through the window 404 for detection.

The computer system 101 coupled to the touch panel display screen 150 may include a processor 102 that receives detection signals from the detectors 159. A detection signal may indicate that an energy beam 207 has been detected by a detector 159. If an expected detection signal is not received by the processor 102, the processor 102 may determine that an energy beam 207 has been interrupted by a touch. The processor 102 may execute computer-executable instructions for calculating the position of a touch on the exterior side of the window 404 based on absent detection signals. For example, the processor 102 may determine that two or more intersecting energy beams 207 channelled across the exterior of the window 404 have been interrupted. Based on these absent detection signals, the positions of the intersecting energy beams 207 relative to the window 404, and the angles between the intersecting energy beams 207, the processor 102 may be configured to calculate the position at which the interruption occurred. A more detailed example of a method for calculating a touch position is described below with reference to FIG. 6.

In use, the touch panel display system 100 may potentially be used to display advertising images to a person positioned on the exterior side of the window 404. Advertising images may be used to capture the person's attention. Further information regarding the advertisement may be obtained by the person touching the window 404 relative to particular icons displayed on the display screen 152. Such icons may represent commands or requests for further information. As mentioned, the touch panel display system 100 can detect the position of a touch on the window 404 and may thus determine with which icon the person is intending to interact.

Of course, the present invention is not limited to the display of advertising images. Any images, icons or other indicia may be displayed on the display screen 152, including images that are intended to be touch-interactive and images that are not intended to be touch-interactive. In addition, the emitters 156, detectors 159 and the emission guides 208, 308 may be positioned such that the touch-interactive area is actually larger than the display screen 152. As shown in FIG. 5, the protective/decorative bezel 409 that houses the exterior emission guides 208 is wider than the display screen 152. Posters or other signage 502A&B apart from the display screen 152 may thus be displayed in the touch-interactive area, such that a touch on a portion of a poster 50A&B may generate an instruction for the computer system 101.

The provision of a touch panel display screen 150 that is operable through the window 404 may eliminate the need to provide a keyboard, mouse, or other peripheral device exterior to a building for interacting with the computer system 101. As an example, the display screen 152 may display a "virtual" keyboard to allow text to be entered by touching the appropriate icons on the display screen 152. Those skilled in the art will recognize, however, that peripheral devices may be provided relative to the exterior side of the window 404, if desired, without departing from the spirit and scope of the present invention. For example, a printer, scanner, mouse, stylus may be provided outside the building in order to collect data from or provide data to the potential customer. Any peripheral devices provided external to the window 404 may be housed in a secure protective enclosure in such a manner as to be accessible to the user.

In some embodiments the touch panel display system 100 may include a printer that is located on either side of the window 404. The printer may be used to simply display printed information to a user, or alternatively to dispense printed information to the user. In other embodiments the touch panel display system 100 may be associated with bar code scanners or magnetic strip readers that allow information printed or encoded onto a card or other medium to be supplied to the computer system 101. Furthermore, peripheral devices may also comprise components or facilities to electronically transmit information to a location or address specified by the user. In some instances the user may specify an email or facsimile address to which information sourced from the display system is to be sent. Thus, peripheral devices may be used, if desired, to facilitate financial transactions, to identify a user to the computer system 101, to provide additional information to the user, etc.

Figure 6:
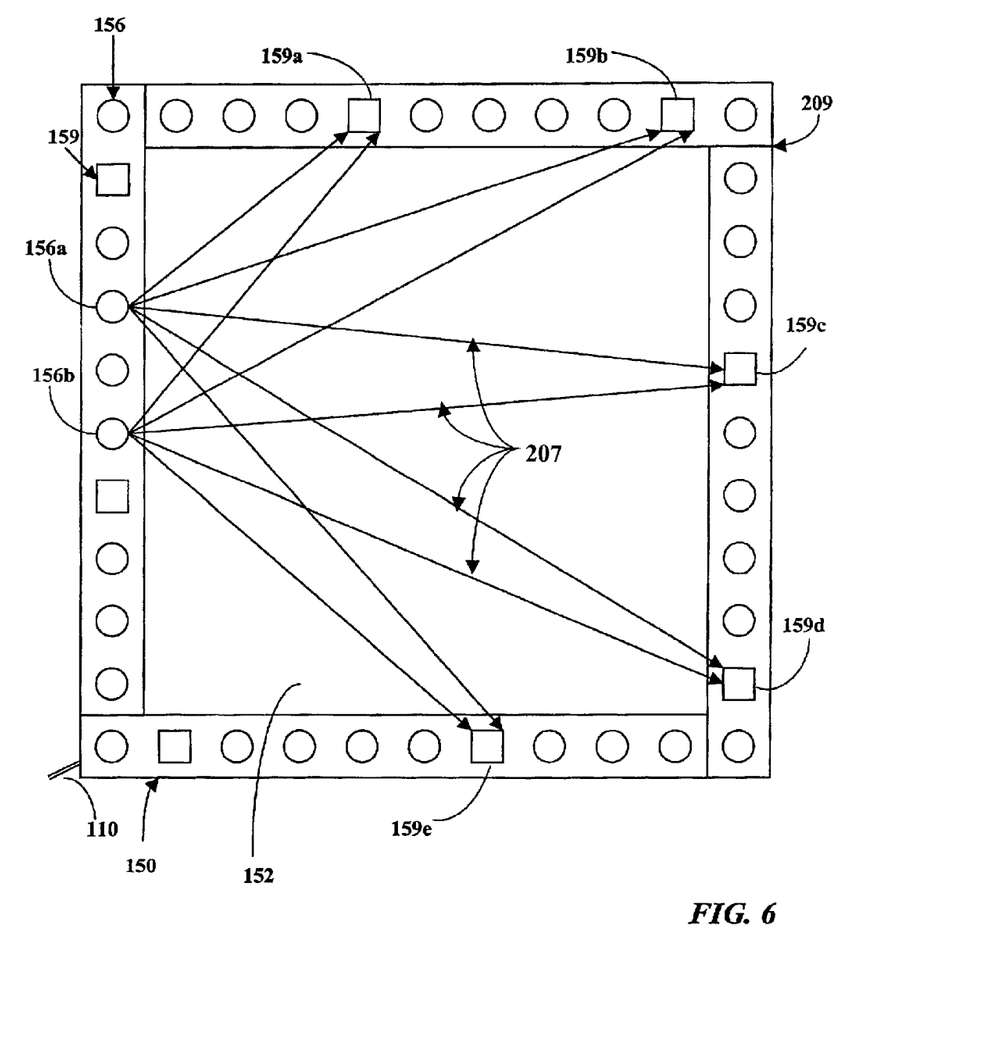
FIG. 6 shows a plan schematic diagram of components of a touch panel display system as configured with respect to an exemplary embodiment of the present invention.

FIG. 6 shows a plan schematic diagram of elements or components of the invention as configured with respect to an exemplary embodiment. As shown, an array of emitters 156 may be clustered around the sides of a display screen 152. The emitters 156 are adapted to generate and transmit a number of energy beams 207 across the exterior side of a protective barrier 204 using a number of emission guides 208, 308 (not shown) so that the energy beams 207 will run parallel to the face of the display screen 152. Further emission guides 208, 308 (not shown) can again be used to channel the energy beams 207 back through the protective barrier 204 and onto or towards the detectors 159 arrayed around the edges of the display screen 152.

A touch panel display screen 150 of the present invention may include at least one energy emitter 156. Preferably, a touch panel display screen 150 of the present invention includes at least two emitters 156 that emit intersecting energy beams, so that a position at which both energy beams are interrupted can be calculated to determine the location of the user's touch. By having each emitter 156 transmit a beam of energy over different parts or areas of the display screen 152 external to a protective barrier 204, the number of separate emitters 156 that need to be incorporated into the touch panel display screen 150 are substantially reduced compared to prior art touch panel designs.

Each emitter 156 may be adapted to emit a single energy beam that diverges out from the location of the emitter 156 across an area of the display screen 102 external to a protective barrier 204. For the sake of clarity, FIG. 6 shows a number of ray lines 207 of the diverging beams emitted by two of the emitters 156a and 156b. Each emitter 156 may be adapted to diverge an emitted energy beam 207 to cover a particular area of the display screen 152, so as to ensure that each energy beam 207 can be detected by more than one detector 159 positioned around the edges of the display screen 152.

An exemplary touch panel display screen 150 of the present invention also includes at least one detector 159 adapted to receive and detect an energy beam 207 generated by an emitter 156. A detector 159 in accordance with the present invention may be adapted to receive and detect an energy beam 207 that is directed towards it at an incident angle. Accordingly, a detector 159 may be capable of receiving energy beams 207 transmitted to it over a range of angles, as opposed to merely receiving energy beams 207 transmitted directly at it or at 90° to the edge of the display screen 152 on which it is mounted. In a preferred embodiment, a detector 159 may be able to detect an energy beam 207 transmitted to it over a range of angles from zero to 180°. Those skilled in the art should appreciate that as the angle at which an energy beam 207 strikes a detector 159 moves away from 90° relative to the surface on which the detector 159 is mounted, the strength or power of the energy beam 207 involved would need to increase to ensure that the energy beam 207 is detected.

Preferably, a number of detectors 159 are arranged or positioned around the edges of the display screen 152 in such a manner as to ensure that all the energy beams 207 generated by emitters 156 can be received and detected. The actual number and positioning of the detectors 159 may be dictated by the geometry of the display screen 152, the angles at which each detector 159 can receive an energy beam 207, and the number of emitters 156 positioned around each side of the display screen 152. Each detector 159 may be used to receive and detect energy beams transmitted by a number of different emitters 156, thereby reducing the number of components that are required to detect all energy beams 207 generated by the emitters 156. In an exemplary embodiment each side of the display screen 152 may include, or have located adjacent to it, two detectors 159.

The emitters 156 may be activated according to a particular cycle. For example, each of the emitters 156 positioned around the edge of the display screen 152 may be activated in a relatively rapid sequence. Activating the emitters 156 in a relatively rapid sequence help to ensure that a single touch by a user on the protective barrier 204 will interrupt the energy beams 207 emitted by several different emitters 156, where each of the interrupted energy beams 207 are emitted at different times. Cyclical activation of the emitters 156 can be used to either increase the sensitivity or resolution of the touch panel display system 100, or to potentially reduce the number of emitters 156 required to accurately detect the user's touch.

Each emitter 156 may be configured to emit an energy beam 207 to several detectors 159 at a set time. Detectors 159 incorporated into the present invention may then be used to build a detection map 125 indicating which detectors 159 should be receiving energy beams 207 from particular emitters 156 at any point in time. This configuration of both the emitters 156 and detectors 159 can be used to either substantially reduce the number of components used to implement a touch panel display system 100 without compromising its accuracy, or alternatively may be used to improve the resolution or accuracy of such a touch panel display system 100. The activation of each of the emitters 156 may be timed so tat only a limited number of emitters 156 emit energy beams across the display screen 152 at one particular point in time.

As mentioned, the emitters 156 and detectors 159 may be configured such that a finger or stylus placed on or adjacent to the display screen 152 will interrupt two or more of the energy beams 207 with the interruption being detected by one or more of the detectors 159. Each detector 159 may be connected via a cable or wiring harness 610 to a computing device 101 which may execute one or more software program modules for controlling the emitters 156 and detectors 159, calculating the position of a use's touch on the display screen 152, and controlling the display of information on the display screen 152. Based on the detection signals supplied from each of the detectors 109, the computing device 101 may be configured to determine the location of the protective barrier 204 that was touched. For example, the computing device 101 may compare a detection map 125b created at the time of the touch with previously stored detection maps 125a created when the protective barrier 204 was not being touched. The differences between the detection maps 125a&b can then be used to determine the touch location.

These and other methods for calculating the location of a touch based on interrupted intersecting energy beams 207 are described in more detail in U.S. patent application Ser. No. 09/788,307, entitled "Touch Panel Display System" and filed on Feb. 16, 2001, which is incorporated herein by reference in its entirety. Those skilled in the art will appreciate, however, that any method known in the art for detecting a touch position on a touch panel display screen may be employed in accordance with the present invention. In response to determining the touch location on the protective barrier 204, computing device 101 may determine the portion of the displayed information with which the user was attempting to interact. The computing device 101 may then, for example, be configured to supply additional information to the user or to receive information from the user.

In a preferred embodiment each detector 159 may include variable sensitivity circuitry to adjust the energy level threshold at which the detector 159 will indicate that an energy beam 207 has been interrupted. Such circuitry may for example take the form of automatic gain control components installed into circuitry associated with each detector 159 when the touch panel display system 100 is manufactured. Such components may in effect automatically calibrate each detector 159 to ensure that it functions accurately in all levels of ambient light. This feature of the invention substantially simplifies its manufacture and design. No additional connections, wires or input lines are required for each detector 159 to allow its sensitivity to be adjusted depending on ambient light conditions. The automatic gain control circuitry used may automatically adjust the sensitivity of the detector 159 depending on the current environmental conditions.

In a further preferred embodiment the time period for which each emitter 156 is activated to emit an energy beam 207 may be varied depending on ambient light levels. For example, the time period or "duty cycle" over which an emitter 156 is activated may be increased during the day when ambient light levels are high, then reduced at night when ambient light levels are low. This feature will allow an exemplary touch panel display system 100 of the present invention to function accurately during the day when high levels of light-based "noise" are present, and will also allow the duty cycle of each emitter 156 to be reduced at night when the additional emitted energy is not required.

The computing device 101 may also be configured to adjust the duty cycle of emitters 156 so that the automatic gain control components of detectors 159 will reset the sensitivity levels of detectors 159 for the current ambient light level. For example, in one embodiment the computing device 101 may reduce the duty cycle of emitters 156 until it starts to detect errors or transient 'touch events'. At this stage the computing device 101 may then increase the duty cycle of emitters 156 slightly to eliminate these errors and to set the emitter duty cycle at the lowest level possible. This calibration procedure may be used in accordance with an exemplary embodiment of the invention to automatically adjust for variances in ambient light levels and to control the sensitivity of each detector 159 depending on those variances. However, those skilled in the art will appreciate the above systems need not necessarily be incorporated into a touch panel display system 100 of the present invention. In a more simplified embodiment, a clock or other timing system may be used to modify or adjust the sensitivity of the detectors 159 depending on the time of day. Also, a touch panel display system 100 of the present invention may not include any components for adjusting detector sensitivity or emitter duty cycle.

The touch panel display system 100 of the present invention may be implemented in a variety of environments. For example, the present invention may provide an after-hours information kiosk that can receive instructions or requests for information from a user while still securing the hardware components of the system. Other configurations of the invention are also possible, ranging from touch panel display components for a television, or for fast food drive-in ordering system, or alternatively as an interactive display inside a retail establishment.

The present invention may also be used in conjunction with a wide range of different types of display screens 152.

Any surface that can display an image to a user can serve as a display screen 152 in accordance with the present invention. The present invention may be implemented either in a factory situation where an original display screen is manufactured or alternatively may be adapted so as to be fitted to an existing display screen already owned by a user. With a retro-fitting embodiment, a processor associated with the invention may be interfaced with existing components of the display screen or alternatively the present invention may harness a processor which pre-exists in connection with the display screen.

The functionality provided by the present invention gives it the ability to improve on a number of different types of devices that employ display screens. For example, cellular phones, personal digital assistants or hand held computers, laptop computers, telephones, calculators, televisions, standard computers, appliances and tools of all shapes and forms, game machines, security devices, information kiosks, in-vehicle information systems, medical equipment, testing equipment, or commercial point of sale devices may all incorporate display screen with which the present invention may be used. The present invention may allow these and other devices to be shielded by a protective barrier while still being adapted to provide an intuitive and easy-to-use touch panel interface.

It should be appreciated that the foregoing is related to a description of certain exemplary embodiments of the present invention. Modifications and variations to the exemplary embodiments may become apparent to those skilled in the art. It should also be appreciated that many features and aspects of the present invention are described above by way of example only and are therefore not to be interpreted as required or essential elements of the invention, unless so stated. Accordingly, the scope of the present invention is to be defined only by the claims and not by the foregoing description of exemplary embodiments.

I claim:

1. A protected touch panel display system comprising:
   a protective barrier through which light and energy can be emitted, the protective barrier having an interior side and an exterior side;
   a display screen for displaying information, the display screen positioned relative to the interior side of the protective barrier;
   a plurality of emitters positioned relative to the interior side of the protective barrier, each of the emitters adapted for emitting energy beams;
   a plurality of detectors positioned relative to the interior side of the protective barrier and each adapted to a generate a detection signal upon detecting any one of the energy beams;
   at least one emission guide positioned relative to the exterior side of the protective barrier and adapted to receive the energy beams from the interior side of the protective barrier and to channel the received energy beams across the exterior side of the protective barrier and through to the interior side of the protective barrier for detection by at least one of the detectors;
   a computer-readable medium for storing detection maps indicating which of the detectors should be receiving one of the energy beams from at least one of the emitters at any point in time; and
   a processor for executing computer-executable instructions for:
   generating a reference detection map based on the detection signals generated by the detectors and storing the reference detection map on the computer-readable medium,
   periodically generating a current detection map based on the detection signals generated by the detectors at a current point in time, wherein the current detection map and the reference detection map are generated at different times,
   accessing the computer-readable medium to compare the current detection map to the reference detection map in order to determine an absence of expected detection signals from at least one of the detectors,
   based on the absence of the expected detection signals, determining that at least two of the energy beams have been interrupted by a touch of the protective barrier, and
   based on the at least two interrupted energy beam, determining the location of the touch on the protective barrier.

2. The protected touch panel display system of claim 1, wherein the reference detection map comprises an average of several previously stored detection maps.

3. The protected touch panel display system of claim 1, wherein the processor executes further computer executable instructions for controlling activation of the emitters.

4. The protected touch panel display system of claim 3, wherein controlling activation of the emitters comprises controlling the emitters to emit the energy beams in a cycle such that each emitter is activated and deactivated according to a sequence.

5. The protected touch panel display system of claim 4, wherein the cycle is rapid enough to substantially ensure that a plurality of the energy beams will be interrupted by a touch of the protective barrier, each of the interrupted energy beams being emitted by different ones of the emitters at different times.

6. The protected touch panel display system of claim 3, wherein controlling activation of the emitters comprises controlling the duty cycle of the emitters.

7. The protected touch panel display system of claim 6, wherein the detectors are adapted for automatic gain control for adjusting the sensitivity of the detectors in response to a change in the duty cycle of the emitters.

8. The protected touch panel display system of claim 3, wherein the duty cycle of the emitters is changed depending on ambient light levels.

9. The protected touch panel display system of claim 1, wherein each of the detectors is capable of detecting the energy beams transmitted by the emitters over a range of angles.

10. A method for implementing a protected touch panel display screen comprising:
   providing a protective barrier through which light and energy can be emitted, the protective barrier having an interior side and an exterior side;
   positioning a display screen relative to the interior side of the protective barrier, the display screen adapted for displaying information;
   positioning a plurality of emitters relative to the interior side of the protective barrier, each of the emitters adapted for emitting energy beams;
   positioning a plurality of detectors relative to the interior side of the protective barrier, each of the detectors adapted to receive the energy beams over a range of angles and to generate a detection signal upon detecting any one of the energy beams, wherein the number of detectors is less than the number of emitters, such that not every emitter is aligned on-axis with a corresponding detector;

positioning at least one emission guide relative to the exterior side of the protective barrier, the at least one emission guide adapted to receive the energy beams from the interior side of the protective barrier and to channel the received energy beams across the exterior side of the protective barrier and through to the interior side of the protective barrier for detection by at least one of the detectors; and wherein the plurality of emitters and the plurality of detectors are positioned such that the energy beams channeled across the exterior side of the protective barrier substantially cover the display screen, so that a touch of the protective barrier at any location relative to the display screen can be detected.

11. The method of claim 10, wherein the display screen, the emitters and the detectors are not accessible from the exterior side of the protective barrier.

12. The method of claim 10, wherein signage is displayed on the interior side of the protective barrier so as to be visible from the exterior side of the protective barrier; and wherein the plurality of emitters and the plurality of detectors are positioned such that the energy beams channeled across the exterior side of the protective barrier substantially cover the display screen and the signage, so that a touch of the protective barrier at any location relative to the display screen or the signage can be detected.

13. The method of claim 10, wherein a touch of the protective barrier will interrupt at least two of the energy beams and will cause at least one of the detectors to not detect the at least two interrupted energy beams.

14. The method of claim 13, further comprising determining a location of the touch on the protective barrier based on the interrupted energy beams.

15. The method of claim 10, further comprising controlling an activation cycle of the emitters such that each emitter is activated and deactivated according to a sequence.

16. The method of claim 15, wherein the activation cycle of the emitters is rapid enough to substantially ensure that a plurality of the energy beams will be interrupted by a touch of the protective barrier, each of the interrupted energy beams being emitted by different ones of the emitters at different times.

17. The method of claim 10, further comprising positioning at least one interior emission guide relative to the interior side of the protective barrier, the at least one interior emission guide adapted to receive the energy beams from at least one of the emitters and channel the energy beams through to the exterior side of the protective barrier.

18. The method of claim 10, further comprising positioning at least one interior emission guide relative to the interior side of the protective barrier, the at least one interior emission guide adapted to receive the energy beams from the exterior side of the protective barrier and to channel the energy beams to at least one of the detectors.

19. The method of claim 10, further comprising changing a duty cycle of the emitters depending on ambient light levels.

20. The method of claim 19, further comprising adapting the detectors for automatic gain control for adjusting the sensitivity of the detectors in response to a change in the duty cycle of the emitters.

21. The method of claim 10, wherein the protective barrier comprises a layer of glass.

22. The method of claim 21, wherein the layer of glass comprises a window.

23. A protected touch panel display system comprising:

a protective barrier through which light and energy can be emitted, the protective barrier having an interior side and an exterior side;

a display screen for displaying information, the display screen positioned relative to the interior side of the protective barrier;

a plurality of emitters positioned relative to the interior side of the protective barrier, each of the emitters adapted for emitting energy beams;

a plurality of detectors positioned relative to the interior side of the protective barrier, each of the detectors adapted to receive the energy beams over a range of angles and to generate a detection signal upon detecting any one of the energy beams, wherein the number of detectors is less than the number of emitters, such that not every emitter is aligned on-axis with a corresponding detector;

at least one emission guide positioned relative to the exterior side of the protective barrier, the at least one emission guide adapted to receive the energy beams from the interior side of the protective barrier and to channel the received energy beams across the exterior side of the protective barrier and through to the interior side of the protective barrier for detection by at least one of the detectors; and wherein the plurality of emitters and the plurality of detectors are positioned such that the energy beams channeled across the exterior side of the protective barrier substantially cover the display screen, so that a touch of the protective barrier at any location relative to the display screen can be detected.

24. The protected touch panel display system of claim 23, wherein the display screen, the emitters and the detectors are not accessible from the exterior side of the protective barrier.

25. The protected touch panel display system of claim 23, wherein signage is displayed on the interior side of the protective barrier so as to be visible from the exterior side of the protective barrier; and wherein the plurality of emitters are positioned such that the energy beams channeled across the exterior side of the protective barrier substantially cover the display screen and the signage, so that a touch of the protective barrier at any location relative to the display screen or the signage can be detected.

26. The protected touch panel display system of claim 23, wherein the touch of the protective barrier will interrupt at least two of the energy beams and will cause at least one of the detectors to not detect the at least two interrupted energy beams.

27. The protected touch panel display system of claim 26, wherein a location of the touch on the protective barrier is determined based on the interrupted energy beams.

28. The protected touch panel display system of claim 23, further comprising means for controlling an activation cycle of the emitters such that each emitter is activated and deactivated according to a sequence.

29. The protected touch panel display system of claim 28, wherein the activation cycle of the emitters is rapid enough to substantially ensure that a plurality of the energy beams will be interrupted by a touch of the protective barrier, each of the interrupted energy beams being emitted by different ones of the emitters at different times.

30. The protected touch panel display system of claim 23, further comprising at least one interior emission guide positioned relative to the interior side of the protective barrier, the at least one interior emission guide adapted to receive the energy beams from at least one of the emitters and channel the energy beams through to the exterior side of the protective barrier.

31. The protected touch panel display system of claim 23, further comprising a least one interior emission guide positioned relative to the interior side of the protective barrier, the at least one interior emission guide adapted to receive the energy beams from the exterior side of the protective barrier and to channel the energy beams to at least one of the detectors.

32. The protected touch panel display system of claim 23, further comprising means for changing a duty cycle of the emitters depending on ambient light levels.

33. The protected touch panel display system of claim 32, wherein the detectors are adapted for automatic gain control for adjusting the sensitivity of the detectors in response to a change in the duty cycle of the emitters.

34. The protected touch panel display system of claim 23, wherein the protective barrier is constructed from a material selected from the group consisting of glass, plastic, plexiglass, acrylic and crystal.

* * * * *